US012131504B2

(12) United States Patent
Hua et al.

(10) Patent No.: US 12,131,504 B2
(45) Date of Patent: Oct. 29, 2024

(54) SUPPRESSION OF CLIPPING ARTIFACTS FROM COLOR CONVERSION

(71) Applicant: Texas Instruments Incorporated, Dallas, TX (US)

(72) Inventors: Gang Hua, Katy, TX (US); Mihir Narendra Mody, Bengaluru (IN); Niraj Nandan, Plano, TX (US); Shashank Dabral, Allen, TX (US); Rajasekhar Reddy Allu, Plano, TX (US); Denis Roland Beaudoin, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 246 days.

(21) Appl. No.: 17/538,268

(22) Filed: Nov. 30, 2021

(65) Prior Publication Data

US 2023/0169689 A1    Jun. 1, 2023

(51) Int. Cl.
*G06K 9/00* (2022.01)
*G06T 1/20* (2006.01)
*G06T 7/90* (2017.01)

(52) U.S. Cl.
CPC .................. *G06T 7/90* (2017.01); *G06T 1/20* (2013.01); *G06T 2207/10024* (2013.01); *G06T 2207/20208* (2013.01)

(58) Field of Classification Search
CPC ... G06T 7/90; G06T 1/20; G06T 2207/10024; G06T 2207/20208; G06T 3/4015; G06T 5/009; G06T 5/002; H04N 1/58; H04N 1/648; H04N 23/86; H04N 1/60; H04N 23/83; H04N 23/87
See application file for complete search history.

(56) References Cited

U.S. PATENT DOCUMENTS

| | | | | |
|---|---|---|---|---|
| 7,038,814 B2* | 5/2006 | Huovinen | ................ | G09G 5/02 358/1.9 |
| 8,503,815 B2* | 8/2013 | Dvir | ......................... | G06T 5/92 382/164 |

(Continued)

FOREIGN PATENT DOCUMENTS

| | | | | |
|---|---|---|---|---|
| JP | 5661218 B2 * | 1/2015 | ............... | G06T 9/00 |
| RU | 2709652 C1 * | 12/2019 | ............... | G09G 5/02 |

(Continued)

*Primary Examiner* — Shervin K Nakhjavan

(74) *Attorney, Agent, or Firm* — Carl G. Peterson; Frank D. Cimino

(57) ABSTRACT

Techniques for image processing including receiving input image data, wherein the input image data includes data associated with a clear color channel, receiving a color offset value associated with a color channel, wherein color values for the color channel are not provided in the input image data, based on the color offset value, generating intermediate estimated color values for the color channel, wherein generating the intermediate estimated color values includes: clipping color values that have a magnitude greater than the color offset value, and adjusting color values that have a magnitude less than the color offset value based on the color offset value, applying a color correction function to the intermediate estimated color values based on the color offset value to determine color corrected estimated color values, and outputting the color corrected estimated color values.

20 Claims, 3 Drawing Sheets

(56) References Cited

U.S. PATENT DOCUMENTS

| | | | |
|---|---|---|---|
| 9,172,888 B2* | 10/2015 | Geiss | H04N 23/71 |
| 9,332,239 B2* | 5/2016 | Cote | H04N 23/843 |
| 9,337,223 B2* | 5/2016 | Chieh | H01L 27/1461 |
| 9,497,355 B2* | 11/2016 | Hayasaki | H04N 1/4074 |
| 9,686,448 B2* | 6/2017 | Tajbakhsh | H04N 5/165 |
| 9,749,534 B2* | 8/2017 | Martinello | H04N 23/60 |
| 10,530,995 B2* | 1/2020 | Douady-Pleven | H04N 1/603 |
| 10,916,036 B2* | 2/2021 | Nikkanen | G06T 5/50 |
| 11,217,142 B1* | 1/2022 | Buckley | G06T 5/10 |
| 11,301,971 B2* | 4/2022 | Le Naour | G06T 5/50 |
| 11,481,873 B2* | 10/2022 | Zavalishin | G06F 18/2415 |
| 11,521,300 B2* | 12/2022 | Ren | G06T 1/20 |
| 11,606,544 B2* | 3/2023 | Yue | G06T 5/40 |
| 11,637,998 B1* | 4/2023 | Pieper | H04N 23/85 348/207.99 |
| 11,805,332 B2* | 10/2023 | Choi | G06T 1/20 |
| 2003/0085906 A1* | 5/2003 | Elliott | G09G 3/20 345/698 |
| 2009/0167673 A1* | 7/2009 | Kerofsky | G09G 3/3413 345/102 |
| 2012/0141027 A1* | 6/2012 | Hatakeyama | H04N 1/58 382/167 |
| 2013/0128061 A1* | 5/2013 | Hsu | H04N 23/81 348/208.4 |
| 2013/0321675 A1* | 12/2013 | Cote | H04N 25/134 382/167 |
| 2014/0139642 A1* | 5/2014 | Ni | H04N 23/13 382/162 |
| 2014/0313375 A1* | 10/2014 | Mlinar | H04N 25/134 348/241 |
| 2016/0260199 A1* | 9/2016 | Takahama | G06T 5/002 |
| 2016/0269693 A1* | 9/2016 | Moriguchi | H04N 25/134 |
| 2018/0097992 A1* | 4/2018 | Douady-Pleven | H04N 9/77 |
| 2019/0149693 A1* | 5/2019 | Cao | H04N 23/88 382/167 |
| 2021/0080630 A1* | 3/2021 | Hsu | H04N 25/13 |
| 2021/0168269 A1* | 6/2021 | Wheatley | H04N 23/16 |
| 2022/0038648 A1* | 2/2022 | Iida | H04N 25/778 |
| 2022/0165193 A1* | 5/2022 | Buckley | G06T 5/10 |
| 2022/0368873 A1* | 11/2022 | Nakamura | H04N 9/646 |
| 2023/0145535 A1* | 5/2023 | Hatamizadeh | G06N 3/02 514/460 |
| 2023/0211722 A1* | 7/2023 | Li | G06T 7/11 315/82 |
| 2023/0293570 A1* | 9/2023 | Jiang | C12N 15/63 536/24.5 |

FOREIGN PATENT DOCUMENTS

| | | | | |
|---|---|---|---|---|
| WO | WO-2019104047 A1 * | 5/2019 | | G06T 5/009 |
| WO | WO-2019182567 A1 * | 9/2019 | | G06K 15/1881 |
| WO | WO-2019182629 A1 * | 9/2019 | | G06K 15/1881 |

* cited by examiner

SUPPRESSION OF CLIPPING ARTIFACTS FROM COLOR CONVERSION

BACKGROUND

In digital imaging, an image sensor includes a large number of pixels, each of which can generate color values and brightness information for light detected by the pixel. This pixel data may be received and processed by an image processor. Generally, the image processor may process the image data from the sensor to generate color information, perform demosaicing, noise reduction, color correction, filtering, data formatting, etc.

Improvements to image sensors have allowed image sensors to become more sensitive to light. As an example, a dynamic range of pixels of the image sensor have increased, allowing for increases in a bit depth of the image data from the sensor. The increased bit depth is useful for high dynamic range (HDR) (e.g., wide dynamic range) images, which have an expanded dynamic range as compared to non-HDR (e.g.; traditional 12-bit) images. The expanded dynamic range may be accommodated by an increased bit depth, which increases the number of values available to represent the image data from pixels of the image sensor. This increased bit depth may increase processing loads for the image processor, and techniques to help increase the performance of the image processor while minimizing cost and space used by the image processor may be useful.

SUMMARY

Aspects of this disclosure relate to a technique for image processing including receiving input image data, wherein the input image data includes data associated with a clear color channel for pixels of the image data. The technique also includes receiving a color offset value associated with a color channel, wherein color values for the color channel are not provided in the input image data for pixels of the image data. The technique further includes generating estimated color values for the color channel, wherein the estimated color values include negative color values. The technique also includes applying a color correction function to the estimated color values having negative color values based on the color offset value and outputting the estimated color values and color corrected estimated color values.

Another aspect of the present disclosure relates to an image processing pipeline including a front end module for receiving image data, wherein the input image data includes data associated with a clear channel for pixels of the image data and a color processing module including a demosaicing module. The demosaicing module is configured to receive a color offset value associated with a color channel, wherein color values for the color channel are not provided in the input image data for pixels of the image data. The demosaicing module is also configured to generate estimated color values for the color channel, wherein the estimated color values include negative color values. The demosaicing module is further configured to apply a color correction function to the estimated color values having negative color values based on the color offset value; and output the clipped estimated color values and color corrected estimated color values.

Another aspect of the present disclosure relates to a non-transitory program storage device comprising instructions stored thereon. The instructions cause one or more processors to receive input image data, wherein the input image data includes data associated with a clear channel for pixels of the image data. The instructions also cause the one or more processors to receive a color offset value associated with a color channel, wherein color values for the color channel are not provided in the input image data for pixels of the image data. The instructions further cause the one or more processors to generate estimated color values for the color channel, wherein the estimated color values include negative color values. The instructions also cause the one or more processors to apply a color correction function to the estimated color values having negative color values based on the color offset value and output the clipped estimated color values and color corrected estimated color values.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
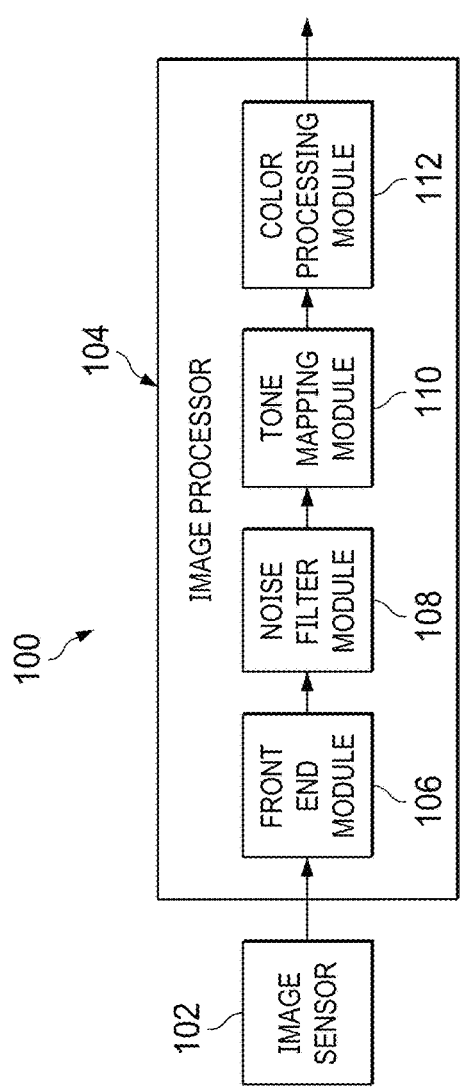
FIG. 1 is a block diagram illustrating an overview of an image processing pipeline, in accordance with aspects of the present disclosure.

FIG. 1 is a block diagram 100 illustrating an overview of an image processing pipeline, in accordance with aspects of the present disclosure. As shown, an image sensor 102 may capture image information at a certain bit depth, such as 24 bits. The image sensor 102 may include sets of pixels which are sensitive to certain colors of light. In some cases, the pixels may be sensitive to three or four colors and grouped into color channels. These pixels may sense an intensity of light in a certain color and generate a value based on the intensity of light sensed. The bit depth defines a number of values that can be sensed and/or reported by the image sensor 102. As an example, each pixel of a 24-bit image sensor may be able to describe ~16 million levels (e.g., brightness) of a color of light as compared to a pixel of a 12-bit image sensor, which may be able to describe 4096 levels of the color of light. This increased bit depth helps allows for a greater dynamic range to be described and also helps increase a supported contrast ratio for the image sensor 102. The image sensor 102 may assemble pixel values into image data, for example, by scanning each pixel line by line and passing this generated image data to an image processor 104.

The pixels of the image sensor 102 may have a color filter array, which allows each pixel to measure one color of light, such as red, blue, green, infrared, etc. The color filter array may also include clear regions which cause an associated pixel to measure luminance. The sensitivity of the pixels, colors supported, and levels of color that the pixels can detect and encode (e.g., bit depth) may define a color space of the image sensor 102. The pixels may capture light based on a linear dynamic range where the color value of the light captured by the pixel varies linearly across the range of color values that the pixel is sensitive to.

The colors of light filtered by the color filter array and captured by image sensor 102 may vary based on a pattern. For example, an image sensor with a Bayer color filter pattern (e.g., RGGB or RGB pattern) may be based on a grid pattern where, for four pixels of a square grid, one pixel captures red light, two pixels capture green light, and one pixel captures blue light. As another example, a variant of RGGB pattern, RCCB, may use clear pixels in place of the green pixels. The RCCB pattern may help increase light sensitivity to provide better low-light performance.

In some cases, the image sensor 102 may compand the image data, compressing the image data with a larger bit depth (e.g., dynamic range) to fit within a smaller bit depth for transmission to the image processor 104. For example, the image sensor 102 may compand a 24-bit signal from the pixels for output as a 16-bit signal to the image processor 104. This companding process may convert image data from the pixel of the image sensor, which has a linear dynamic range, to raw image data with a nonlinear dynamic range.

A front end module 106 of the image processor 104 may receive the image data from the image sensor 102, convert this raw image data to a more convenient format such as a gamma or log compressed format, and perform some aspects of image correction such as gamma correction, lens shading correction, white point adjustment, etc. As an example, the image sensor 102 may provide a companded signal and the front end module 106 may convert this companded signal to a format that is more easily handled by components of the image processor 104. The front end module 106 may also perform gamma correction. The image data may include luminance data as well as color information, and gamma correction may apply this luminance data to the color information and correct issues such as lens shading, white point adjustment, etc. The front end module 106 may be coupled to a noise filter module 108, and the front end module 106 may output image data to the noise filter module 108. The noise filter module 108 may apply one or more noise filters to reduce noise in the image data. The noise filter module 108 may be coupled to a tone mapping module 110, and the noise filter module 108 may output the filtered image data to the tone mapping module 110.

The tone mapping module 110 helps adjust the dynamic range of the image data for display in a medium, such as a monitor, which may support a dynamic range less than that supported by the image data. For example, a 16-bit image data from the image sensor 102 may have a linear dynamic range, and this image data may be converted into a 12-bit image data with a nonlinear dynamic range by the tone mapping module. This converted image data may then be passed to a color processing module 112 for demosaicing and color conversion.

In some cases, color conversion may include generating color information not directly captured by the image sensor. For example, RCCB image sensors include pixels with a clear filter and the filter array of such sensors do not include a dedicated green color filter, as compared to RGGB image sensors. As a part of color conversion, inferred green color information may be generated based in part on information from the clear pixels of the RCCB image sensor. Some alternative color processing modules 112 can generate such green color information for regular definition images. However, this generation process can introduce color artifacts due, at least in part, on color clipping. This color clipping may occur due to how green values may be calculated. For example, it is possible for the green value to become negative in certain conditions when adjacent red and blue values are subtracted from a clear (e.g., luminance) value. In such cases, the green value may be clipped to zero and display as an artifact with a false red/pink/purple color. Reddish artifacts may be problematic in some cases, such as for autonomous vehicle applications, which may attempt to detect various red colored objects, such as red lights, red taillights, stop signs, etc. In some cases, the color artifacts may be reduced based on an offset determined as a part of color correction.

Figure 2:
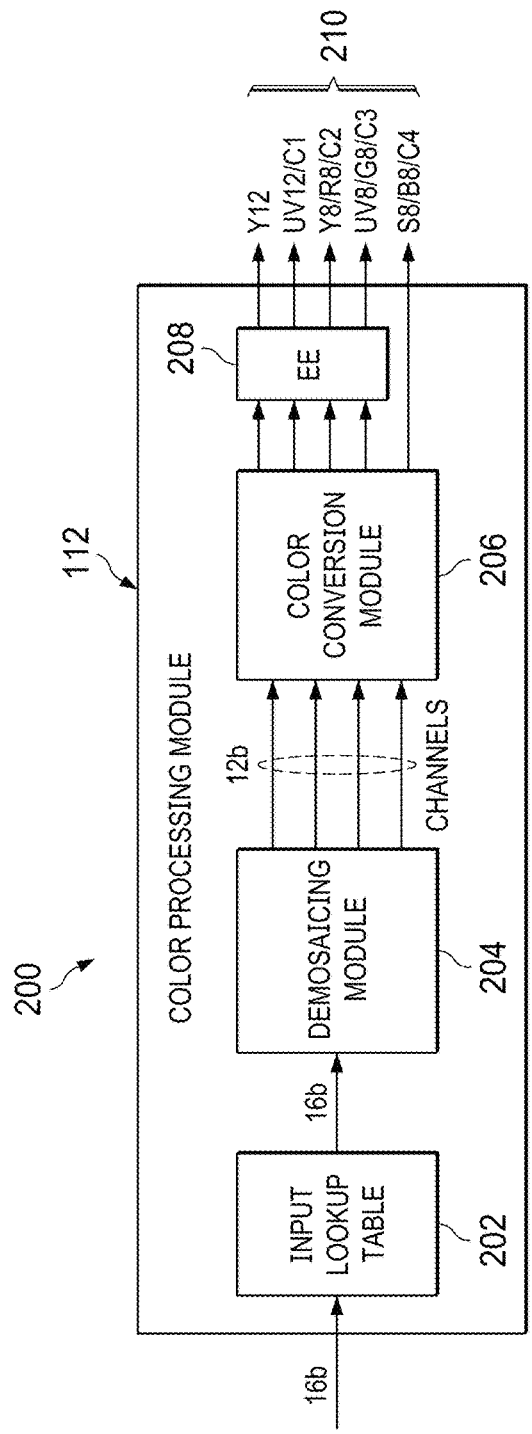
FIG. 2 is a block diagram illustrating aspects of a color processing module, in accordance with aspects of the present disclosure.

FIG. 2 is a block diagram 200 illustrating aspects of a color processing module 112, in accordance with aspects of the present disclosure. As shown, the color processing module 112 includes a data path for processing the image data. In this example, data path of the color processing module 112 includes an input lookup table 202, which may receive the image data input into the color processing module 112. The input lookup table 202 may help adjust the color format to a format that is expected by the other components of the color processing module 112. In this example, the input lookup table 202 is configured to receive 16-bit image data and output 16-bit image data. The input lookup table 202 may output to a demosaicing module 204.

The demosaicing module 204 may generate color values for pixels of the image data that were not captured (e.g., the color values of pixels of the image data are incomplete), for example, due to the structure of the image sensor. The demosaicing module 204 is discussed further below. The demosaicing module 204 may then output values for each color channel for each pixel. For example, for a particular pixel, the demosaicing module 204 may output a red value, green value, blue value, and the luminance value. In this example, the demosaicing module 204 may be configured to receive 16-bit image data with a linear dynamic range and output 12-bit image data with a nonlinear dynamic range. The demosaicing module 204 may output image data to a color conversion module 206.

The color conversion module 206 may convert the color space from a color space as seen by the image sensor to a reference color space. For example, an imaging sensor may capture light differently as compared to a human eye, and the color conversion module 206 may translate the colors as captured by the imaging sensor into a color space that is more natural for the human eye. Similarly, the color conversion module 206 may be configured to translate the colors captured by the imaging sensor into a color space expected for a machine vision algorithm. In some cases, the transformations applied by the color conversion module 206 may be configured, for example, by users of the image processor (e.g., a manufacturer/designer using an image processor with a certain image sensor) to tailor the output. In this example, as the demosaicing module 204 is configured to output 12-bit image data, the color conversion module 206 may be configured in a manner similar to existing 12-bit color conversion modules 206. In some cases, the color conversion module 206 may be configured to directly output one or more color channels. The color conversion module 206 may also be configured to output color channels to an edge enhancement (EE) module 208. The EE module may be configured to enhance edge contrast to help sharpen and remove noise from the image data. In some cases, the EE module 208 may be configured to operate in a manner similar to existing 12-bit EE modules 208. The EE module 208 may generate an output image data 210. The output image data 210 may be in any image format. In some cases, the EE module 208 may be configured to output image data in various formats. For example, the EE module 208 may be configured to output multiple color channels and/or modify the color channel data for various formats. The bit depth of the image data may be the same as or less than the bit depth of the image data input to the EE module 208. In this example, the output image data 210 may be up to 12-bit.

Figure 3:
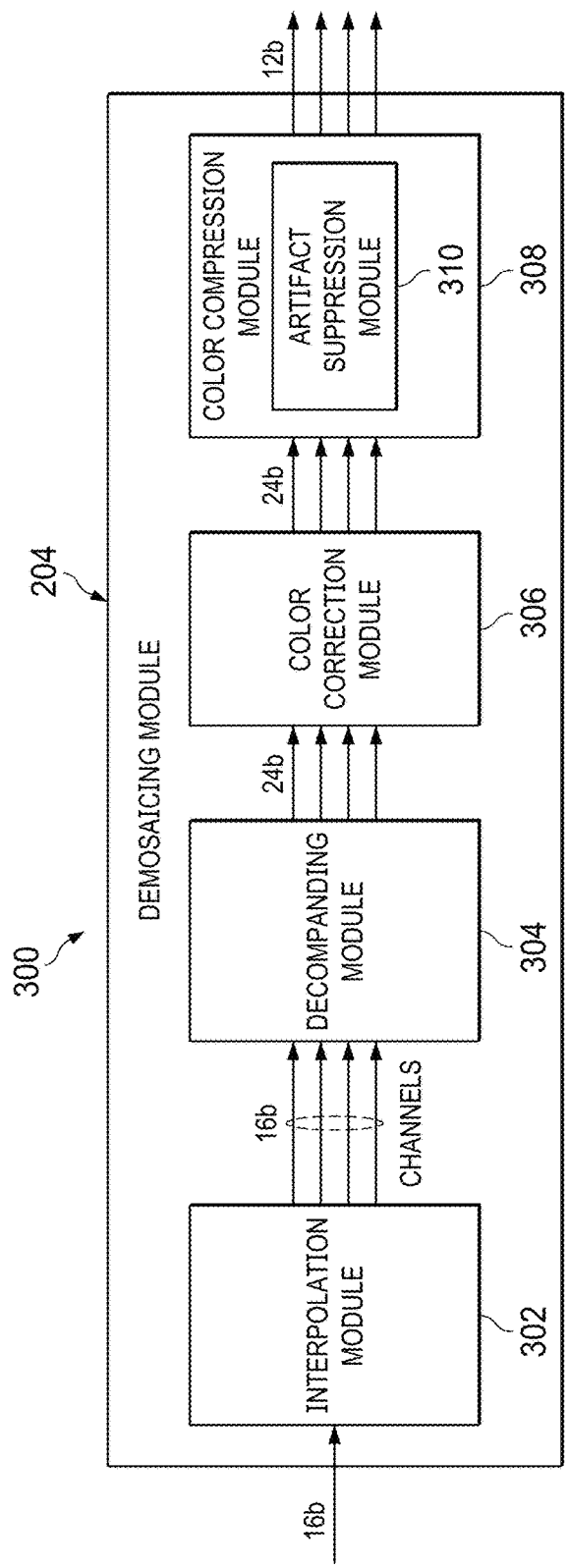
FIG. 3 is a block diagram illustrating a data flow of a demosaicing module, in accordance with aspects of the present disclosure.

In some cases, a 12-bit color processing module 112 may be configured to support higher bit depths, such as 24-bit image data, and perform color correction on image data with a linear dynamic range, primarily by adapting the demosaicing module 204 to handle higher bit depth image data. FIG. 3 is a block diagram 300 illustrating a data flow of a demosaicing module 204, in accordance with aspects of the present disclosure. As shown, image data input to the demosaicing module 204 may be received by an interpolation module 302. The interpolation module 302 may be similar to existing 12-bit interpolation modules but configured to support an additional four bits of precision (e.g., 16-bit image data).

The interpolation module 302 estimates color values pixels of the image data. As an example, an image sensor may have a pixel grid with a color filter arranged such that each pixel is configured to capture a certain color of light. For example, with an image sensor with a Bayer pattern, a set of four pixels may capture light of different colors with one pixel configured to capture red light, one pixel configured to capture blue light, and two pixels configured to capture green light. Interpolation then fills in color values that are not captured by the pixels based on neighboring pixels that did capture those colors. Thus, during interpolation, a green value and blue value may be filled in for a red pixel based on values from neighboring green and blue pixels. Similarly, green and red values may be filled in for a blue pixel based on values from neighboring green and red values. Any known interpolation technique may be implemented, such as bilinear interpolation, adaptive homogeneity directed interpolation, bicubic interpolation, etc. It may be understood that other image sensor patterns may also be supported. For example, image data captured using a red, clear, clear, blue (RCCB) sensor may also be interpolated by the interpolation module 302.

After interpolation, each pixel may be associated with four values (e.g., channels). For example, where the image sensor pattern includes three color values, after interpolation, each pixel may be associated with three color values (and a luminance value). As another example, an image sensor with four colors in the image sensor pattern may include four color values per pixel, and image sensor patterns with less than three color in the image sensor pattern may be associated with the number of colors in the image sensor pattern plus luminance. Color values corresponding for a certain color for each pixel can be grouped into color channels. For example, a green color channel may include the green color value for each pixel, the red color channel may include the red color values for each pixel and so forth.

In some cases, the interpolation module 302 may also support adjusting a gain and offset for each color channel. For example, the green, red, and blue channels may each be associated with a gain value and an offset value. In some cases, a sensitivity of the image sensor for the different color channels may differ and the gain and offset values may be used to help correct the expression of the different color channels to balance the color channels. In some cases, the gain and offset values may be user configurable, for example, based on the image sensor used. In some cases, the gain and offset values may be configured during a calibration process. The offset value may be based on a value range for a color channel. For example, where a color channel supports 256 values, then the offset may be set to the middle of the range, or 128. The gain value may be based on an amplitude range or variance of the values for a color channel. For example, where color values for a color channel have a large range (or variance) the gain may be lowered to help fit the color values into an output range. The gain and offset value may be used for providing an unsigned bipolar color difference signal, for a color channel which indicates a difference between color values for each pixel. For example, the bipolar color difference signal may indicate a difference in value between the red value and the green value for a pixel, a difference between the blue value and green value for a pixel, etc. In such cases, the bipolar color difference signal may include negative values. However, the image processor may support only unsigned values. An offset value may be used to indicate where the zero value is for the unsigned values.

After interpolation, the interpolation module 302 may output multi-channel image data (e.g., three color channels, plus a luminance value channel) to a decompanding module 304. In some cases, the image sensor may compand a higher bit depth signal into a lower bit depth signal for transmission to an image processor. For example, the image sensor may compand a 24-bit signal from the pixels for output as a 16-bit signal to the image processor. The image sensor may sense a higher bit signal with a linear dynamic range. This higher bit signal may be companded into a lower bit image data by compressing the linear dynamic range into a non-linear dynamic range. This companded image data may be expanded by the decompanding module 304 to restore the linear dynamic range. For example, the decompanding module 304 may decompand a 16-bit companded image data into a 24-bit image data with a linear dynamic range. In some cases, the decompanding module 304 may expand the companded signal based on a set of lookup tables (LUTs). The LUTs may include a separate LUT for each color channel (e.g., a red channel LUT, green channel LUT, clear channel LUT, blue channel LUT, etc.) and a LUT for luminance values. In some cases, the decompanding module 304 may use four LUTs for three color channels and a luminance channel.

The LUTs map the companded lower bit values of the image data to higher bit values. In this example, the 16-bit values of the companded signal from the image sensor may be mapped into a 24-bit space using the LUTs. Separate LUTs for each color channel helps allow for per channel nonlinearity correction for the image sensor. In some cases, the LUTs of the decompanding module 304 may be configured/reconfigured by a user, such as an end-user manufacturer. Of note, to help preserve the specific nonlinearity of the companded image data, the tone mapping module of the image processor may be bypassed to help avoid introducing additional nonlinearity into the image data. The decompanding module 304 may output image data with a linear dynamic range to a color correction module 306.

The color correction module 306 may convert color space from the sensor color space to an output color space. For example, the image sensor may sense and map colors in a certain way, forming a color space of the image sensor. As an example, this mapping may be performed using a color correction matrix and an offset vector by multiplying the input color vector (e.g., color values for a pixel) with the color correction matrix and adding the offset. This color space may be converted by mapping the image sensor color space to the desired output color space, and this conversion occurs in a linear space, thus preserving the linear dynamic range. By performing the color conversion in linear space, a more accurate color conversion may be performed as color distortion introduced by converting across nonlinear portions of the color space can be avoided. In some cases, the color space mapping of the color correction module 306 may be configured/reconfigured by a user, such as an end-user manufacturer.

In some cases, the color correction module 306 may determine color values which may not be directly captured by the image sensor. For example, an image sensor may be a RCCB image sensor, capturing clear pixels instead of green. The image data from this image sensor, after interpolation, may include, for a pixel, a clear value, a red value, and a blue value. A green value may be determined based on the values for the clear, red, and blue pixels. As an example, the green value may be determined for a pixel by simply subtracting the red value and the blue value from clear value. As another example, the green value may be determined based on one or more color correction matrices. A color correction matrix may be provided to help map other color values to an expected green value. For example, a 3×3 matrix may be used where three input color channels and three output color channels are configured to express a relationship between a certain color channel and an expected green value. In some cases, for each output color channel, a row in the matrix may be used to convert the input color channels for the corresponding output channel. In some cases, the matrices and/or offset may be user configurable.

Continuing with the matrix example, an unmeasured value (e.g., a green value G) may be determined (e.g., inferred, estimated) by multiplying, for a pixel, measured values (e.g., the red value ($R_i$), clear value ($C_i$), and blue values ($B_i$)) by matrices mapping the per color measured value to the unmeasured (e.g., green) value. For a green example, this matrix mapping operation may be expressed by a function where an estimated green value ($G_e$) may be determined by a function $G_e = M_{G,R}R_i + M_{G,C}C_i + M_{G,B}B_i$. In some cases, the matrix multiplications may result in negative values and the estimated green value may be negative. As negative color values do not make sense, these negative values may be clipped to 0.

Figure 4:
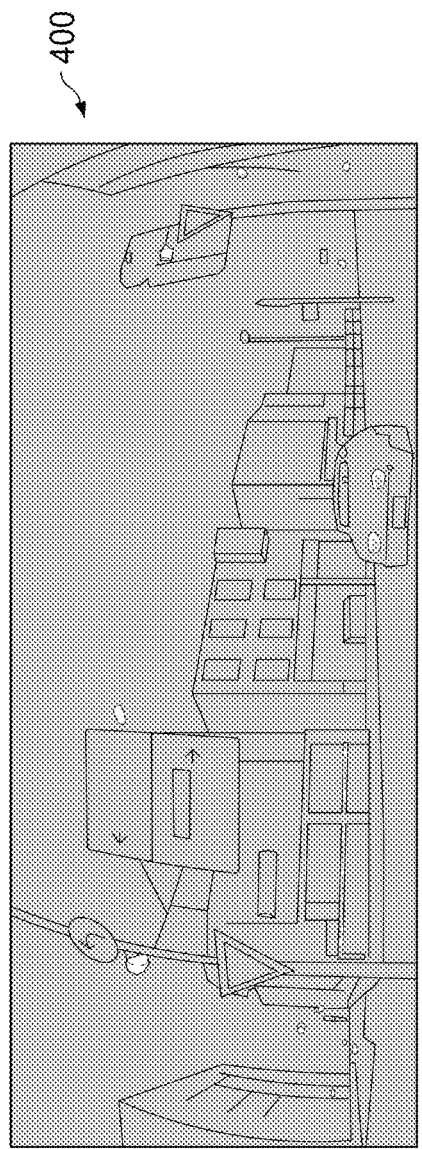
FIG. 4 is a drawing illustrating color clipping, in accordance with aspects of the present disclosure.

FIG. 4 is a drawing 400 illustrating color clipping, in accordance with aspects of the present disclosure. Drawing 400 illustrates pixels of a color plane showing the clear and blue channels. Color clipping is visible in drawing 400 as white blobs appearing on various objects in the drawing 400. Often, this color clipping occurs around high contrast edges as the brightness can fall rapidly. Additionally, noise from the image sensor can also cause the green value to fall below zero and be clipped. In some cases, color clipping due to noise results in negative green values that are relatively close to zero, while color clipping due to contrast artifacts is associated with larger negative green values. As clipping due to noise can generally be handled by noise reduction systems, suppressing clipping due to contrast artifacts can focus on the larger negative green values. Larger negative green values can be distinguished from negative green values that are relatively close to zero based on a threshold value. In some cases, this threshold value may be used as a per-channel offset value. For example, the color correction module 306 may add an offset value to the estimated green value, and this offset value may suppress clipping of smaller negative green values. This matrix color correction offset and clipping may be expressed as a function, such as $G = \max(M_{G,R} R_i + M_{G,C} C_i + M_{G,B} B_i$ Bit Offset$_{G,0}$). In some cases, the offset may be user configurable. In some cases, the threshold may also be integrated into the matrices or separately defined in addition to the offset.

Returning to FIG. 3, the color correction module 306 may output the color corrected image data as intermediate estimated color values that includes any per-channel offsets to a color compression module 308. The color corrected image data may include the estimated green values ($G_e$). The color compression module 308 may encode the higher bit value image data into a lower bit value image data. In this example, the 24-bit image data is converted into a 12-bit image data.

The color compression module 308 may include an artifact suppression module 310 configured to address negative values in the unmeasured channel (e.g., green values) that are more negative (e.g., having a magnitude larger) than the threshold (or offset) value, and which may have still been clipped by the color correction module 306. However, due to the offset applied by the color correction module 306, the relative intensities for pixels that would otherwise be slightly negative are still available to the color compression module 308. In some examples, this allows noise suppression to be applied to noise artifacts without being applied to other types of artifacts where it is not desired.

For example, the color compression module 308 may estimate a corrected green value ($\hat{G}$) based on a function instead of simply clipping to zero. As an example function, the corrected green value may be determined by removing the offset value and taking the absolute value of the estimated green value. This function may be expressed as $G = \text{abs}(G_e - \text{Offset}_G)$. In some cases, another function may be used to determine the corrected green value. Thus in some examples, the color compression module 308 may produce a set of color values that has had artifacts suppressed and that is in a different (e.g., lower) bit-depth representation than the intermediate set of color values received from the color correction module 306. In some examples, estimated corrected color values, such as the corrected green value ($\hat{G}$), which were clipped (e.g., color values which were more negative than the threshold (or offset) value) may be set as a function of the floor value and the offset value.

Figure 5:
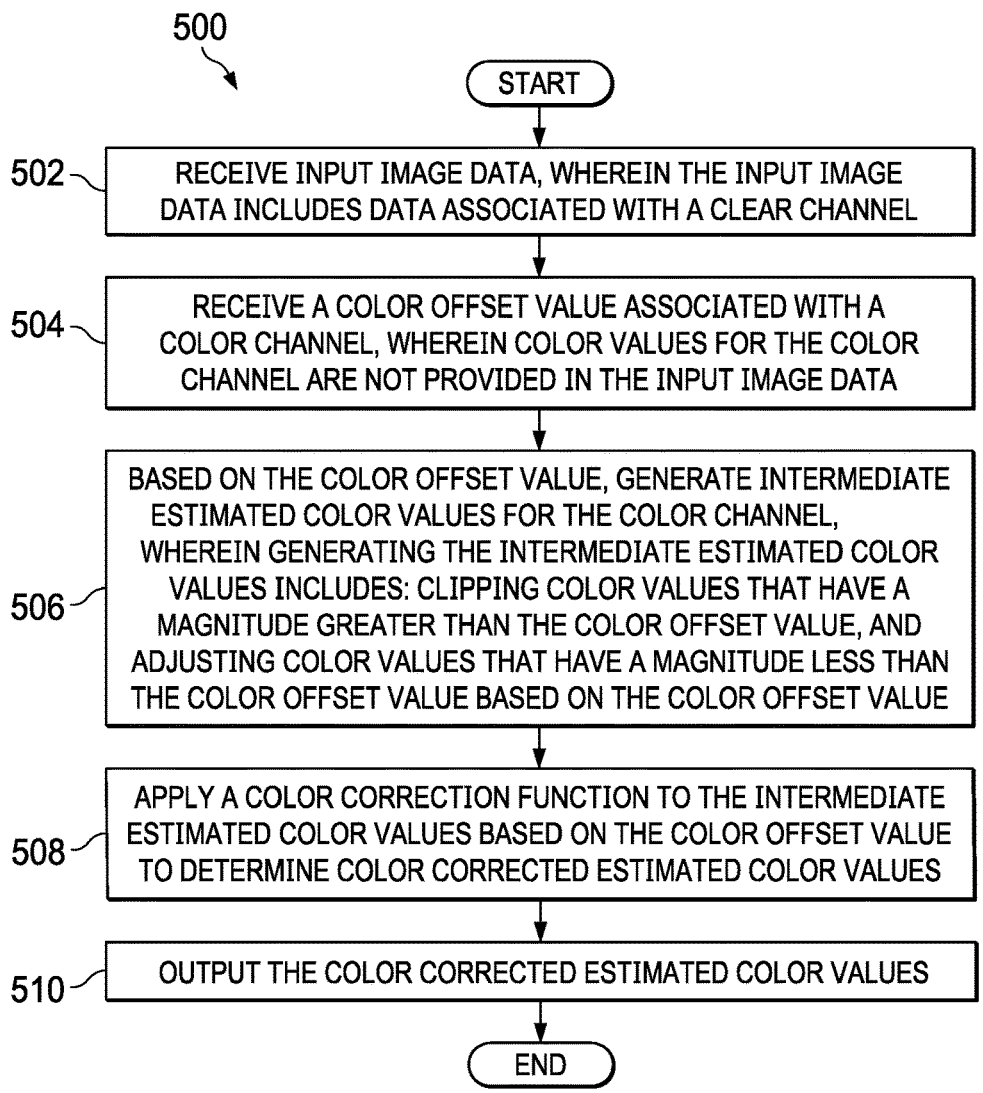
FIG. 5 is a block diagram of an embodiment of an image processing technique, in accordance with aspects of the present disclosure.

FIG. 5 is a block diagram 500 of an embodiment of an image processing technique, in accordance with aspects of the present disclosure. At block 502, input image data is received. For example, the image data may be generated by an image sensor based on a set of pixels. The pixels of the image sensor may have a color filter array, which allows each pixel to capture one color of light, such as red, blue, green, etc. The color filter array may also include a clear filter to allow some pixels to capture clear light. The image sensor is configured to capture light based color channels. However, the color filter and accordingly the image data from the image sensor is lacking at least one color channel desired for output. For example, the image sensor may include pixels configured to capture red and blue light, as well clear pixels configured to capture light without color filtering to generate a red color channel, blue color channel, and clear channel. However, the example image sensor does not include pixels configured to capture only green light. Accordingly, the red color channel, blue color channel, and clear channel include values corresponding to the light values captured by the red pixels, blue pixels, and clear pixels, respectively, from which values for a green channel can be inferred.

At block 504, a color offset value associated with an unmeasured color channel is received (e.g., color values for the color channel are not provided in the input image data for pixels of the image data). For example, the color offset value may be a preconfigured offset value, and/or the color offset value may be user configurable. The color offset value may be associated with the unmeasured color channel, such as a green color channel, values of which are not received from the image sensor. In the case of a RCCB image sensor, a red color channel and a blue color channel, along with a clear channel may be received, but values associated with a green channel may not be received. In some cases, null or nominal values (e.g., all zeros) for the green channel may be received, which also does not provide any color values.

At block 506, intermediate estimated color values for the color channel are generated based on the color offset value, wherein generating the intermediate estimated color values includes one of: clipping color values that have a magnitude greater than the color offset value, and adjusting color values that have a magnitude less than the color offset value based on the color offset value. The intermediate estimated color values include color values that would otherwise be negative if not for the applied color offset, along with color values that would otherwise be negative, but are clipped to zero. For example, one or more color correction matrices may be applied to the received red, blue, and clear values of pixels to estimate a green color value for the green channel. In some cases, separate color correction matrixes may be provided for each color channel. As part of the application of a matrix to determine a value for the unmeasured color channel, the color offset may be applied to the matrix result to determine the intermediate estimated color value. In an example, the color offset is added to each color value so that a subset of the color values that would otherwise be negative (and therefore clipped) and have a magnitude less than the color offset are preserved. A floor function may be applied to values that remain negative even after applying the color offset, clipping such values to a floor value such as 0.

In some cases, the estimated color values may be generated as a part of color correction. This color correction may be performed after the input image data is expanded from the first bit depth to a second bit depth, where the color values of the expanded image data have a linear dynamic range, and where the second bit depth is higher than the first bit depth. In some cases, the input image data may be decompanded to a bit depth corresponding with the bit depth of the pixels of the image sensor. For example, pixels of the image sensor may be able to generate color values within a 24-bit number space with a linear dynamic range. This 24-bit image data may be companded by the image sensor into a 16-bit number space with a nonlinear dynamic range. A decompanding module may decompand the 16-bit number space and expand the color values back into the 24-bit number space. In some cases, color values having a relatively small negative value, that is, negative values within (e.g., an absolute value of) a threshold value, which may be the offset value, may be estimated by summing the color value and the threshold value.

At block 508, a color correction function is applied to the intermediate estimated color values, including the values that would be negative but for the color offset value. Because the intermediate estimated color values include those otherwise negative color values, visual artifacts may be avoided during the color correction function and subsequent processing (e.g., edge detection). The color correction function may also effectively remove the color offset value from the final color values so that the application of the color offset in block 506 does not result in an unintended increase in the intensity of the color channel in the final image. For example, the color correction function may use an absolute value of the intermediate estimated color value as the color value. In some cases where the intermediate color value would otherwise be negative if not for the applied color offset, the offset may be removed and the absolute value taken. In some cases where the intermediate color value would otherwise be negative, but was clipped, the color correction function may apply a function based on the offset value and the floor value. In some cases, this color correction function may be applied by a color compression module. At block 510, the estimated color corrected estimated color values are output.

Figure 6:
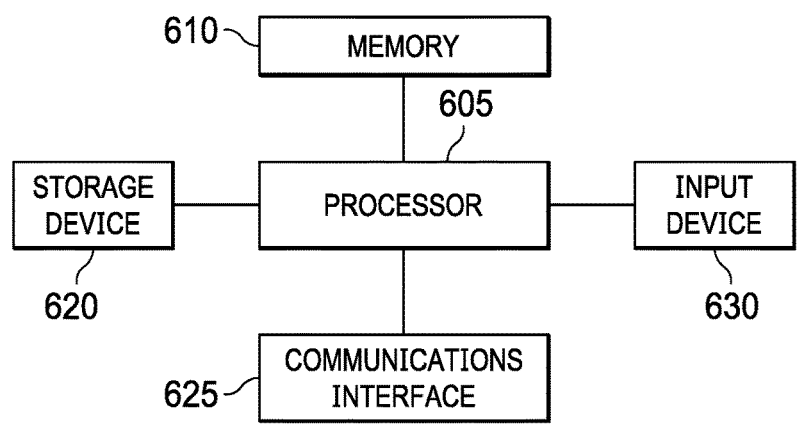
FIG. 6 is a block diagram of an embodiment of a computing device, in accordance with aspects of the present disclosure.

As illustrated in FIG. 6, device 600 includes a processing element such as processor 605 that contains one or more hardware processors, where each hardware processor may have a single or multiple processor cores. Examples of processors include, but are not limited to, a central processing unit (CPU), image processor, or a microprocessor. Although not illustrated in FIG. 6, the processing elements that make up processor 605 may also include one or more other types of hardware processing components, such as graphics processing units (GPUs), application specific integrated circuits (ASICs), field-programmable gate arrays (FPGAs), and/or digital signal processors (DSPs). In certain cases, processor 605 may be configured to perform the tasks described in conjunction with modules 106-112 of the image processor 104 of FIG. 1.

FIG. 6 illustrates that memory 610 may be operatively and communicatively coupled to processor 605. Memory 610 may be a non-transitory computer readable storage medium configured to store various types of data. For example, memory 610 may include one or more volatile devices such as random access memory (RAM), registers, etc. Non-volatile storage devices 620 can include one or more disk drives, optical drives, solid-state drives (SSDs), tap drives, flash memory, electrically erasable programmable read-only memory (EEPROM), and/or any other type memory designed to maintain data for a duration time after a power loss or shut down operation. The non-volatile storage devices 620 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 605. In one embodiment, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage device 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Storage device 620 may be partitioned or split into multiple sections that may be accessed by different software programs. For example, storage device 620 may include a section designated for specific purposes, such as storing program instructions or data for updating software of the computing device 600. In one embodiment, the software to be updated includes the ROM, or firmware, of the computing device. In certain cases, the computing device 600 may include multiple operating systems. For example, the computing device 600 may include a general-purpose operating system which is utilized for normal operations. The computing device 600 may also include another operating system, such as a bootloader, for performing specific tasks, such as upgrading and recovering the general-purpose operating system and allowing access to the computing device 600 at a level generally not available through the general-purpose operating system. Both the general-purpose operating system and another operating system may have access to the section of storage device 620 designated for specific purposes.

The one or more communications interfaces 625 may include a radio communications interface for interfacing with one or more radio communications devices. In certain cases, elements coupled to the processor may be included on hardware shared with the processor. For example, the communications interfaces 625, storage device 620, and memory 610 may be included, along with other elements such as the digital radio, in a single chip or package, such as in a system on a chip (SOC). Computing device 600 may also include input and/or output devices, not shown, examples of which include sensors, cameras, human input devices, such as mouse, keyboard, touchscreen, monitors, display screen, tactile or motion generators, speakers, lights, etc. Processed input, for example from the image sensor, may be output from the computing device 600 via the communications interfaces 625 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Modifications are possible in the described embodiments, and other embodiments are possible, within the scope of the claims.

What is claimed is:

1. A method, comprising:
   receiving input image data that includes values associated with a first channel and not a second channel;
   receiving an offset value that indicates a range; and
   generating values for the second channel, wherein generating the values for the second channel includes:
   generating intermediate values for the second channel based on the values associated with the first channel;
   clipping each of a first subset of the intermediate values that has a magnitude outside the range indicated by the offset value to zero to generate a clipped first subset of the intermediate values;
   adding the offset value to each of a second subset of the intermediate values that has a magnitude within the range to generate a clipped second subset of the intermediate values; and
   applying a correction function to the intermediate values including the clipped first and second subsets of the intermediate values based on the offset value to determine the values for the second channel.

2. The method of claim 1, wherein applying the correction function includes performing noise suppression on the intermediate values.

3. The method of claim 1, wherein the values for the second channel have a different bit depth than the intermediate values.

4. The method of claim 1, wherein the second channel comprises a green channel.

5. The method of claim 1, wherein the input image data includes values associated with a red channel, a blue channel, and a clear channel.

6. The method of claim 5, wherein generating the intermediate values includes generating the intermediate values based on applying one or more matrices to the values associated with the red channel, the blue channel, and the clear channel.

7. The method of claim 6, wherein each matrix of the one or more matrices corresponds to a respective channel of the red channel, the blue channel, and the clear channel.

8. The method of claim 1, wherein applying the correction function includes subtracting the offset value from each of the clipped second subset of the intermediate values to generate a corrected second subset of the intermediate values.

9. The method of claim 8, wherein applying the correction function includes determining an absolute value of each of the corrected second subset of the intermediate values.

10. A system, comprising:
    one or more memories storing instructions; and
    one or more processors configured to execute the instructions to implement an image processing pipeline, wherein the image processing pipeline comprises:
    a front end module configured to receive image data that includes values associated with a first channel and not a second channel; and
    a color processing module configured to:
    generate intermediate values for the second channel based on the values associated with the first channel;
    receive an offset value indicating a range relative to zero;
    clip each of a first subset of the intermediate values that has a magnitude outside the range indicated by the offset value to zero to generate a clipped first subset of the intermediate values;
    add each of a second subset of the intermediate values that has a magnitude within the range and the offset value to generate a clipped second subset of the intermediate values;
    apply a correction function to the intermediate values including the clipped first and second subsets based on the offset value to determine the values for the second channel; and output the values determined for the second channel.

11. The system of claim 10, wherein the first and second subsets of the intermediate values are negative values, and wherein the offset value is a positive value.

12. The system of claim 10, wherein to apply the correction function, the color processing module is configured to perform noise suppression of the intermediate values.

13. The system of claim 10, wherein the values for the second channel have a different bit depth than the intermediate values.

14. The system of claim 10, wherein the second channel comprises a green channel, and the first channel comprises a clear channel.

15. The system of claim 10, wherein to apply the correction function, the color processing module is configured to subtract the offset value from each of the clipped second subset of the intermediate values to generate a corrected second subset of the intermediate values.

16. The system of claim 15, wherein to apply the correction function, the color processing module is configured to determine the values for the second channel based on absolute values of the intermediate values including the corrected second subset of the intermediate values.

17. A non-transitory program storage device comprising instructions stored thereon to cause one or more processors to:

receive input image data that includes values associated with a first channel and not a second channel;

receive an offset value;

generate intermediate values for the second channel based on the values associated with the first channel;

clip each of a first subset of the intermediate values that has a magnitude outside a range indicated by the offset value to zero to generate a clipped first subset of the intermediate values;

add the offset value to each of a second subset of the intermediate values that has a magnitude within the range to generate a clipped second subset of the intermediate values; and determine the values for the second channel based on the clipped first and second subsets of the intermediate values and the offset value.

18. The non-transitory program storage device of claim 17, wherein to determine the values for the second channel, the instructions cause the one or more processors to:

subtract the offset value from the clipped second subset of the intermediate values to generate corrected intermediate values; and determine the values for the second channel based on absolute values of the corrected intermediate values.

19. The non-transitory program storage device of claim 17, wherein the values for the second channel have a different bit depth than the intermediate values.

20. The non-transitory program storage device of claim 17, wherein the instructions further cause the one or more processors to perform noise suppression on the intermediate values.

* * * * *